Aug. 23, 1932.  F. W. HARRIS  1,873,884
HUMIDIFYING APPARATUS
Filed Feb. 28, 1931  3 Sheets-Sheet 1
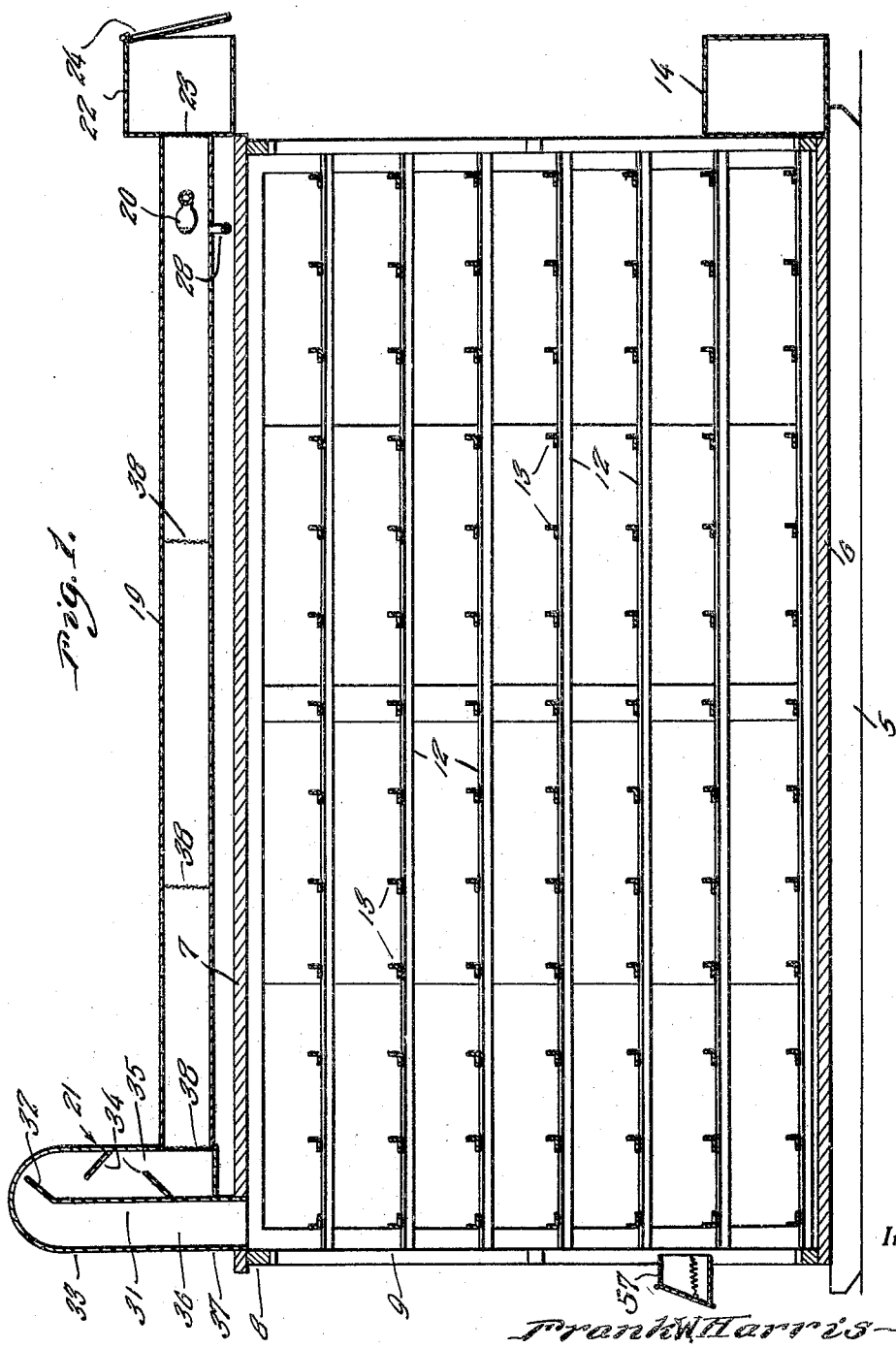
Inventor
Frank W Harris
By Clarence A. O'Brien
Attorney

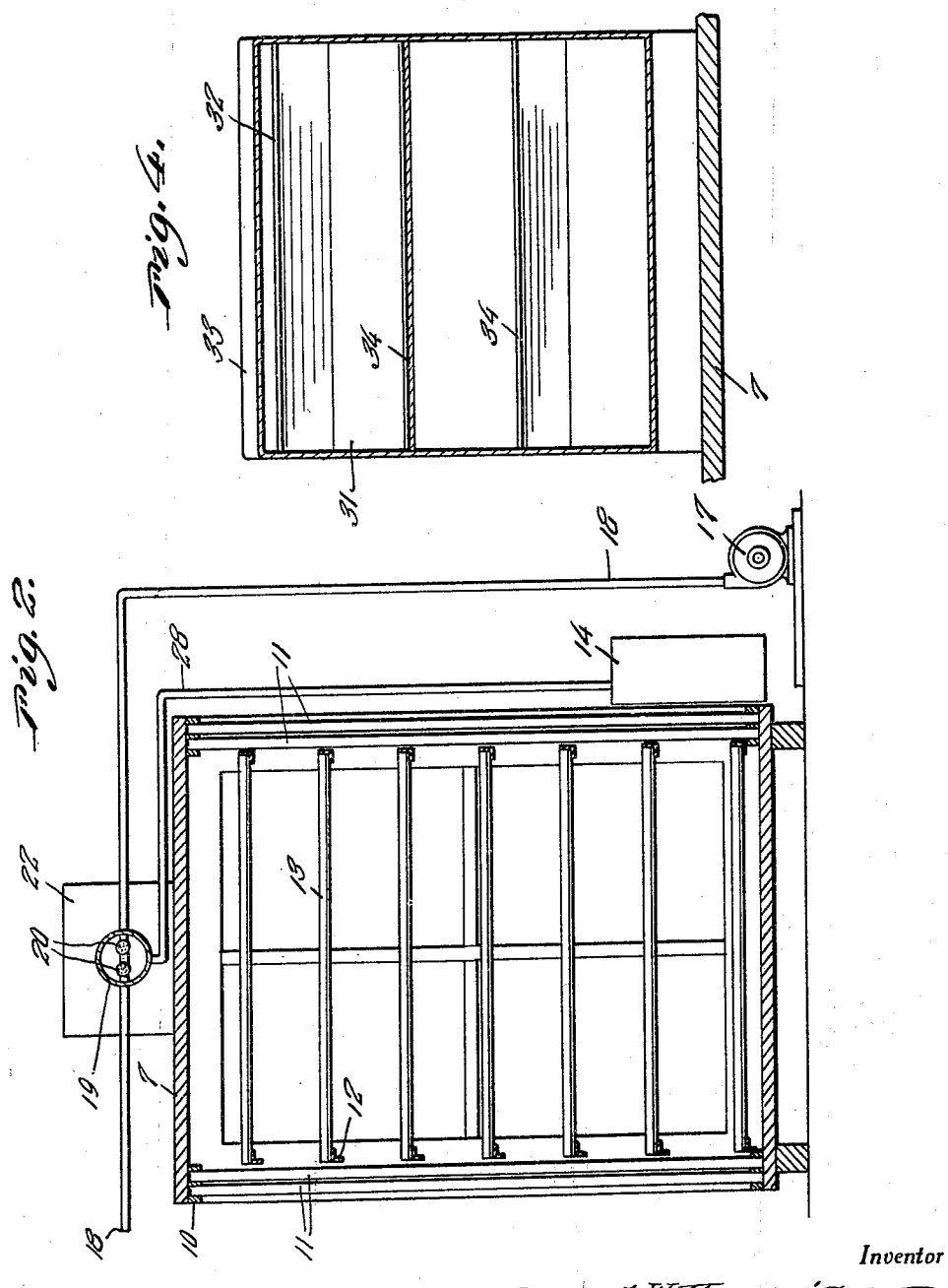

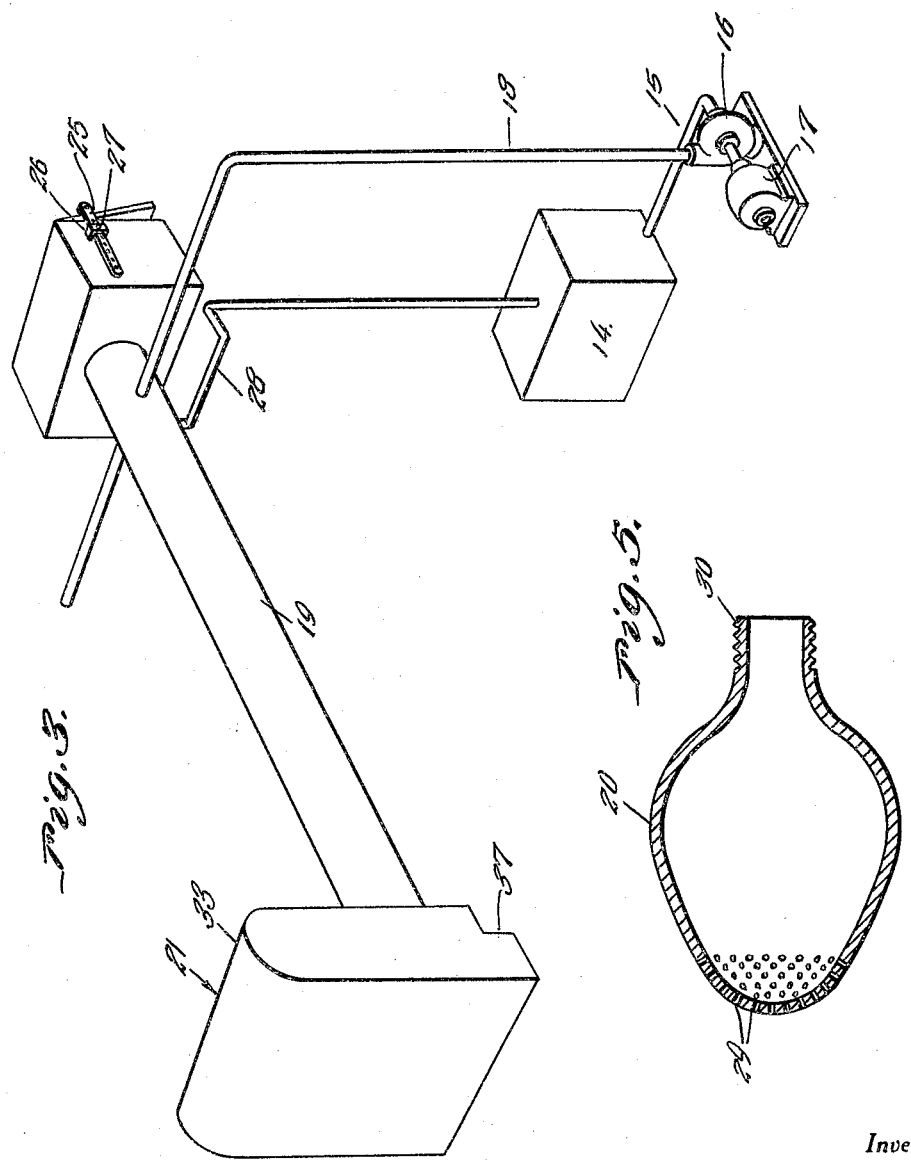

Patented Aug. 23, 1932

1,873,884

UNITED STATES PATENT OFFICE

FRANK W. HARRIS, OF NEW BEDFORD, MASSACHUSETTS

HUMIDIFYING APPARATUS

Application filed February 28, 1931. Serial No. 519,213.

This invention appertains to new and useful improvements in means for humidifying silk, rayon, cotton prints and other materials.

It is understood that material of this nature in its natural dry state, is difficult to weave, and it is the principal object of this invention to provide means whereby such material can be permeated with humidity sufficient to make its condition more desirable in the operation of weaving the same.

Another important object of the invention is to provide a humidity cabinet in which textiles can be placed and humidify the desired amount, thus saving in labor, time and expense.

Other important objects and advantages of the invention will become apparent to the reader of the following specification and claim.

In the drawings:—

Figure 1 represents a longitudinal sectional view through the cabinet.

Fig. 2 represents a transverse sectional view through the cabinet.

Fig. 3 represents a perspective view in the nature of a diagrammatic view disclosing the apparatus for creating the humidity.

Fig. 4 represents a vertical sectional view through the eliminator.

Fig. 5 represents a longitudinal sectional view through one of the nozzles.

Referring to the drawings wherein like numerals designate like parts, it can be seen that numeral 5 represents a base upon which is located the flooring 6. The cabinet is provided with a top 7 and end frames 8 in which window panes 9 are mounted. Each side of the cabinet is provided with guides 10 for the sliding doors 11. With the foregoing structure, an enclosure is provided in which the angle irons 12 are mounted longitudinally for supporting the transversely extending angle irons 13, which serve as guides for the trays on which the thread is placed.

In further carrying out the invention, reference is now made to Fig. 3, wherein, numeral 14 represents the water tank, from which the pipe 15 leads to the pump 16 operated by the electric motor 17. The pump 16 is provided with an outlet pipe 18 which extends upwardly and through the conduit 19 mounted longitudinally upon the top 7 of the cabinet.

The portion of the pipe 18 passing through the conduit 19 has a pair of spray nozzles 20 projecting therefrom, in the direction of the eliminator generally referred to by numeral 21. These spray nozzles 20 are located adjacent one end of the conduit 19 and which point the air intake box 22 is located, having a screen 23 therein for preventing foreign matter from entering the conduit 19. A door 24 is provided on the box 22 and this may be adjusted by the perforated bar 25.

This bar 25 extends through a guide 26 which has a pin or screw 27 therein engageable with the bar through one of its openings. Extending downwardly from the conduit 19 is a drain pipe 28 leading to the tank 14.

It can be seen in Fig. 5, that the nozzle 20 is of a general egg-shaped construction, provided at one end with the perforation 29 at its opposite end with the threaded nipple 30 for engagement into the pipe 18. The eliminator 21 is provided with a vertical partition 31 therein, terminating at its upper end in an obliquely disposed baffle 32, terminating in spaced relation to the upper portion of the casing 33.

Additional baffles 34 are arranged in the chamber 35, while the chamber 36 at the opposite side of the partition 31 is void of baffles and opens into the cabinet.

It can now be seen, that when the motor 17 is started, water will be pumped through the pipe 18 and the same will spray from the nozzle 20 along the conduit 19. It will be observed in Fig. 1, that the interior of the conduit 19 is provided with mesh baffles 38.

The passage of the moistened air through the conduit 19 causes the moisture in the air to be broken up and this action is contiguous as the air passes through the eliminator 21.

The moistened air upon leaving the eliminator 21 enters the cabinet and permeates the material therein and conditions the same for subsequent use.

Should an excess pressure take place within the spring controlled closure 57 will open to relieve the excess pressure. At this point, it might be noted that there is no continuous circulation of the same air through the cabinet, but on the contrary the air from an outside source is constantly introduced into the system and this is allowed to escape by way of the spring closed valve-like element 57 and through such small cracks as are invariably present in cabinets of the kind disclosed.

While the foregoing specification sets forth the invention in specific terms, numerous changes in the shape, size and materials may be resorted to without departing from the spirit and scope of the invention as claimed hereinafter.

Having thus described my invention, what I claim as new is:—

In a humidifying apparatus, a cabinet having material supporting means, a conduit extending along the top of the cabinet and provided at one end with an air inlet and at the other end with an air outlet, there being means controlling the volume of air admitted to said conduit by way of said air inlet, an eliminator establishing constant communication between said outlet end of said conduit and the top of said cabinet, means to furnish a spray of water to said conduit, a water collector having communication with said water supplying means and with said conduit, and a release valve for the cabinet having a spring urging the same to closed position.

In testimony whereof I affix my signature.

FRANK W. HARRIS.